(12) United States Patent
Garg et al.

(10) Patent No.: US 6,327,677 B1
(45) Date of Patent: *Dec. 4, 2001

(54) METHOD AND APPARATUS FOR MONITORING A NETWORK ENVIRONMENT

(75) Inventors: Atul R. Garg, Saratoga; Dan Ketcham, Cupertino; Minh Anh Do, San Jose, all of CA (US)

(73) Assignee: Proactive Networks, Alviso, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,319

(22) Filed: Apr. 27, 1998

(51) Int. Cl.[7] .................................................. G06F 11/00
(52) U.S. Cl. .............................. 714/37; 714/48; 714/732; 709/224
(58) Field of Search ............................... 714/37, 48, 732; 709/224

(56) References Cited

U.S. PATENT DOCUMENTS

| 5,450,406 | * | 9/1995 | Esaki et al. ............................ 370/60.1 |
| 5,491,791 | * | 2/1996 | Glowny et al. .................. 395/183.13 |
| 5,513,126 | * | 4/1996 | Harkins et al. ....................... 364/514 |
| 5,586,254 | * | 12/1996 | Kondo et al. ....................... 395/200.1 |
| 5,616,904 | * | 4/1997 | Fernadez ................................ 235/449 |
| 5,619,656 | * | 4/1997 | Graf ................................. 395/200.11 |
| 5,696,486 | * | 12/1997 | Poliquin et al. ...................... 340/506 |
| 5,699,403 | * | 12/1997 | Ronnen .................................... 379/32 |
| 5,752,062 | * | 5/1998 | Gover et al. ........................... 355/800 |
| 5,799,154 | * | 8/1998 | Kuriyan ............................. 395/200.53 |
| 5,819,028 | * | 10/1998 | Manghirmalani et al. ........ 395/185.1 |
| 5,850,388 | * | 12/1998 | Anderson et al. ..................... 370/252 |
| 5,974,237 | * | 10/1999 | Shurmer et al. ....................... 709/224 |
| 5,974,457 | * | 10/1999 | Waclawski et al. .................. 709/224 |
| 5,991,881 | * | 11/1999 | Conklin et al. ....................... 713/201 |

* cited by examiner

*Primary Examiner*—Ayaz Sheikh
*Assistant Examiner*—Frantz B. Jean
(74) *Attorney, Agent, or Firm*—Blakely, Sokoloff, Taylor & Zafman LLP

(57) ABSTRACT

A system is provided that monitors a network environment. The system collects recent data associated with operation of the network environment. The network environment is analyzed by comparing the collected data with historical data associated with the operation of the network environment. The system determines whether a problem or a potential problem exists based on the analysis of the network environment. The historical data associated with the operation of the network environment is represented in multiple cognitive signatures. The system regularly updates the historical data to include the recently collected data. The data collected may include network performance data, network configuration data, traffic flow data, network utilization data, or network error information. The system generates an alarm if it determines that a problem exists. The generation of an alarm may include generating an electronic mail message or pager message and communicating the message to a network administrator. The generation of an alarm may also include activating an application on a device within the network environment. The monitoring system is able to monitor one or more network environments, as well as individual network devices and components or sub-systems within an individual network device.

46 Claims, 12 Drawing Sheets

METHOD AND APPARATUS FOR MONITORING A NETWORK ENVIRONMENT

FIELD OF THE INVENTION

The present invention relates to network monitoring systems. More specifically, the invention provides a system that detects problems or potential problems in a network environment.

BACKGROUND

Networks are used to interconnect multiple devices, such as computing devices, and allow the communication of information between the various interconnected devices. Many organizations rely on networks to communicate information between different individuals, departments, work groups, and geographic locations. In many organizations, a network is an important resource that must operate efficiently. For example, networks are used to communicate electronic mail (e-mail), share information between individuals, and provide access to shared resources, such as printers, servers, and databases. A network failure or inefficient operation may significantly affect the ability of certain individuals or groups to perform their required functions.

A typical network contains multiple interconnected devices, including computers, servers, printers, and various other network communication devices such as routers, bridges, switches, and hubs. The multiple devices in a network are interconnected with multiple communication links that allow the various network devices to communicate with one another. If a particular network device or network communication link fails, multiple devices, or the entire network, may be affected.

Network management is the process of managing the various network devices and network communication links to provide the necessary network services to the users of the network. Typical network management systems collect information regarding the operation and performance of the network and analyze the collected information to detect problems in the network. For example, a high network utilization or a high network response time may indicate that the network (or a particular device or link in the network) is approaching an overloaded condition. In an overloaded condition, network devices may be unable to communicate at a reasonable speed, thereby reducing the usefulness of the network. In this situation, it is important to identify the network problem and the source of the problem such that the proper network operation can be restored.

Typically, existing network management systems compare the current network performance parameters to one or more threshold values associated with the parameters. For example, an upper threshold of 90 percent may be associated with a network utilization parameter, such that an alarm is generated if the network utilization exceeds 90 percent. A network utilization in excess of 90 percent may indicate an approaching overload condition. Similar thresholds may be provided for other network parameters such as response time or number of errors. Generally, only an upper threshold is provided (e.g., network utilization above a particular threshold).

Typically, thresholds used by existing systems are absolute such that an alarm is generated each time a threshold is crossed. For example, if a network utilization parameter has an associated upper threshold of 90 percent, an alarm is generated if the network utilization is 91 percent for a specified period of time. However, an alarm is not generated if the network utilization is 90 percent for a long period of time. Also, if network utilization drops to five percent because a periodic backup process was not activated, an alarm is not generated since the threshold associated with network utilization was not exceeded.

These existing systems that use thresholds to identify network problems determine the threshold values (e.g., upper limits) based on how the network administrator believes the network should operate. Since these thresholds are typically static, they do not change automatically with changes in the network operation or network configuration. Instead, the network administrator must recalculate (or re-estimate) threshold values manually when a network change occurs. Typically, a single set of threshold values are used for all time periods. Thus, the same thresholds may be used during periods of heavy network utilization (e.g., 2:00 p.m. on a business day) and during periods of minimal network utilization (e.g., 10:00 p.m. on a holiday). Thus, the same threshold values are applied at all times, regardless of the expected or historical network utilization.

For example, if a significant increase in network utilization occurs every Monday at 9:00 a.m. (i.e., the upper threshold is crossed), an alarm may be generated every Monday even though this is a common event that does not necessarily indicate a network problem. Similarly, if a significant increase in network utilization occurs (without crossing the upper threshold) at a time when the network utilization is typically minimal, an alarm is not generated even though a network problem may exist. Thus, existing systems do not consider typical or historical network operation when determining whether a network problem exists.

It is therefore desirable to provide a network-related monitoring system that detects problems or potential problems in a network environment by comparing recent network operation with historical network operation.

SUMMARY OF THE INVENTION

Embodiments of the present invention provide a network-related monitoring system that detects problems or potential problems in a network environment by comparing current network operation and performance data to historical network operation and performance data. The present invention is capable of monitoring the operation and performance of a network environment, including various network devices. In addition to monitoring an overall network environment, embodiments of the present invention monitor the operation and performance of specific devices (such as network devices), including various components or sub-systems within a device. Embodiments of the invention also monitor applications running on one or more devices or systems in a network environment.

An embodiment of the invention provides a system that monitors a network environment by collecting recent data associated with operation of the network environment. The network environment is analyzed by comparing the collected data with historical data associated with the operation of the network environment. Problems are identified based on the analysis of the network environment.

In a particular embodiment of the invention, the historical data is represented in multiple cognitive signatures.

Another embodiment of the invention updates the historical data to include the collected data.

Embodiments of the invention generate an alarm if a problem is identified.

An embodiment of the invention monitors a network device by collecting recent data associated with operation of the network device. The network device is analyzed by comparing the collected data with historical data associated with the operation of the network device. Problems are identified based on the analysis of the network device.

Other embodiments of the invention collect data associated with the performance of a component or sub-system within a network device.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The present invention is related to a network-related monitoring system that detects problems or potential problems in a network environment by comparing current network operation and performance data to historical network operation and performance data. The monitoring system can be used to monitor the operation and performance of a network environment, including various network devices. As discussed herein, network environment shall include all systems, components, sub-systems, network devices, communication links, applications, and any other systems or components (including both software and hardware) coupled to or used in conjunction with a network.

In addition to monitoring an overall network environment, the monitoring system is able to monitor the operation and performance of specific devices (such as network devices), including various components or subsystems within a device. For example, embodiments of the invention are capable of monitoring the performance of a central processing unit (CPU), available memory, and other device conditions. The invention can also monitor applications running on one or more devices or systems (e.g., monitoring application response time).

The historical operation and performance data is updated regularly to reflect recent data collected regarding recent performance of the network and/or devices being monitored. Additionally, embodiments of the present invention consider threshold values (both upper threshold limits and lower threshold limits) when determining whether a problem (or potential problem) exists in a particular network environment. Thus, the monitoring system uses both thresholds and dynamic historical data to detect problems or potential problems in a network environment.

Figure 1:
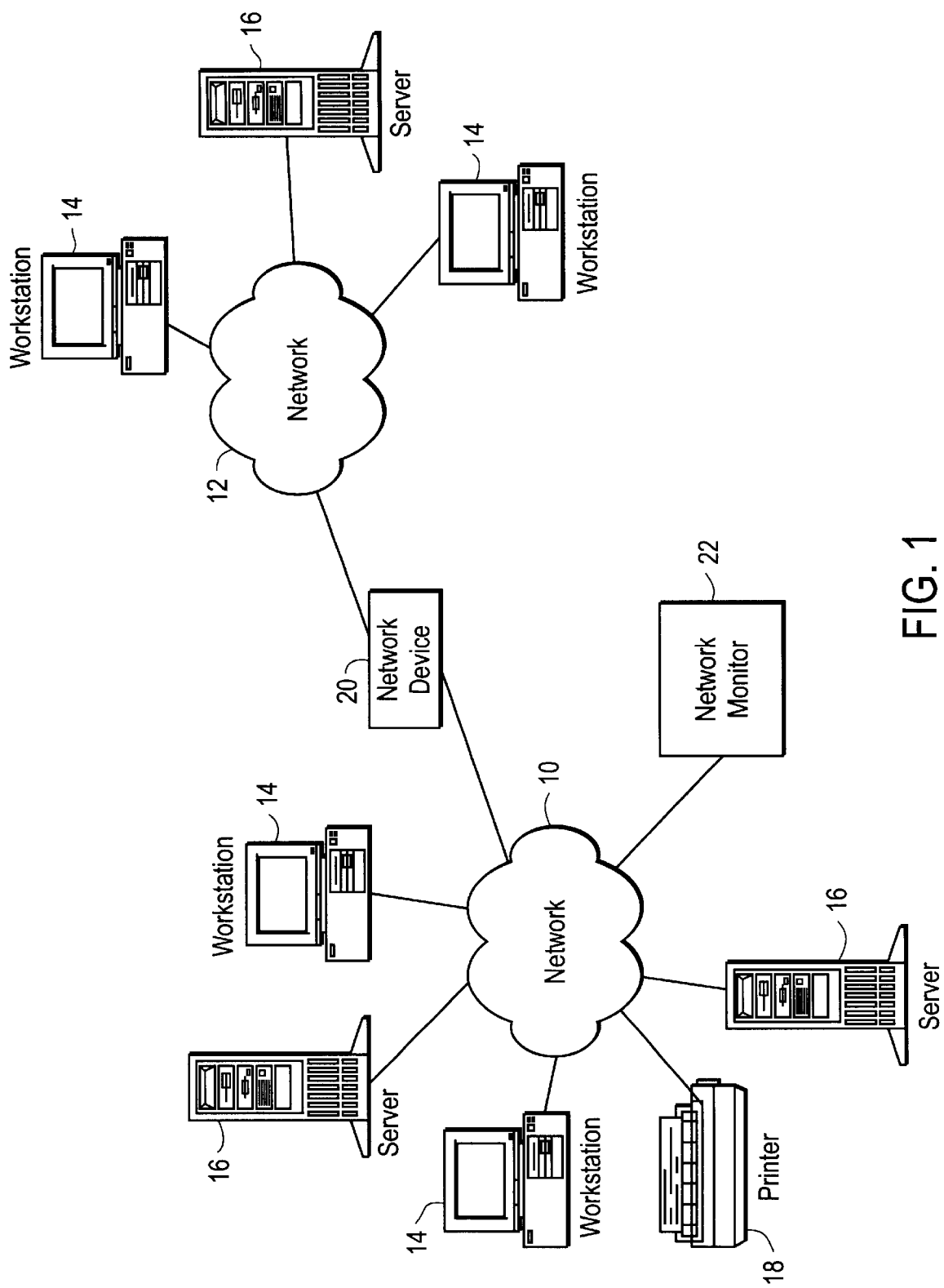
FIG. 1 illustrates an embodiment of a network environment in which the present invention can be implemented.

FIG. 1 illustrates an embodiment of a network environment in which the present invention can be implemented. The network environment of FIG. 1 contains multiple network devices coupled to one another using a pair of networks 10 and 12. In particular, a pair of workstations 14 and a pair of servers 16 are coupled to network 10. Additionally, a printer 18 and a network monitor 22 are coupled to network 10. A network device 20 (such as a router, bridge, switch or gateway) is coupled to both network 10 and network 12. Network device 20 allows network data to be exchanged between network 10 and network 12, thereby allowing network devices coupled to network 10 to communicate with other network devices coupled to network 12. Another pair of workstations 14 and a server 16 are also coupled to network 12. Although FIG. 1 shows four workstations and three servers, a particular network environment may contain any number of workstations, servers, printers, or other network devices interconnected with one another in any configuration. Networks 10 and 12 may use any communication protocol and may utilize any network topology. Additionally, network 10 and network 12 may use different protocols and different network topologies. If different protocols or different topologies are used, then network device 20 is required to translate or otherwise convert data between the two different protocols or two different topologies.

Network monitor 22 is coupled to network 10, but is capable of monitoring network devices, interfaces, and communication links associated with network 10 as well as network 12. Network monitor 22 is also able to monitor the operation and performance of various sub-systems, components, or applications contained within a network device. For example, network monitor 22 can monitor the CPU performance, memory utilization, and application response time of workstations and servers contained in the network environment. Although a single network monitor 22 is shown in FIG. 1, in an alternate embodiment of the invention, a separate network monitor is coupled to network 12. In this embodiment, network monitor 22 monitors network devices, interfaces, and communication links associated with network 10, while the network monitor coupled to network 12 monitors network devices, interfaces, and communication links associated with network 12. In other embodiments of the invention, a single network monitor 22 is capable of monitoring network devices, interfaces, and communication links associated with three or more different networks.

FIG. 1 illustrates an exemplary network environment. Those of ordinary skill in the art will appreciate that the teachings of the present invention can be used with any number of network environments and network configurations. Furthermore, the teachings of the present invention can be used to monitor any network device, system, component, or application for which information can be gathered, either directly or indirectly. Additionally, the present invention is capable of monitoring any communication link or interface within a network or between a network and a network device. Although FIG. 1 illustrates network monitor 22 as a separate network device, network monitor 22 may be incorporated into another network device, such as server 16.

Figure 2:
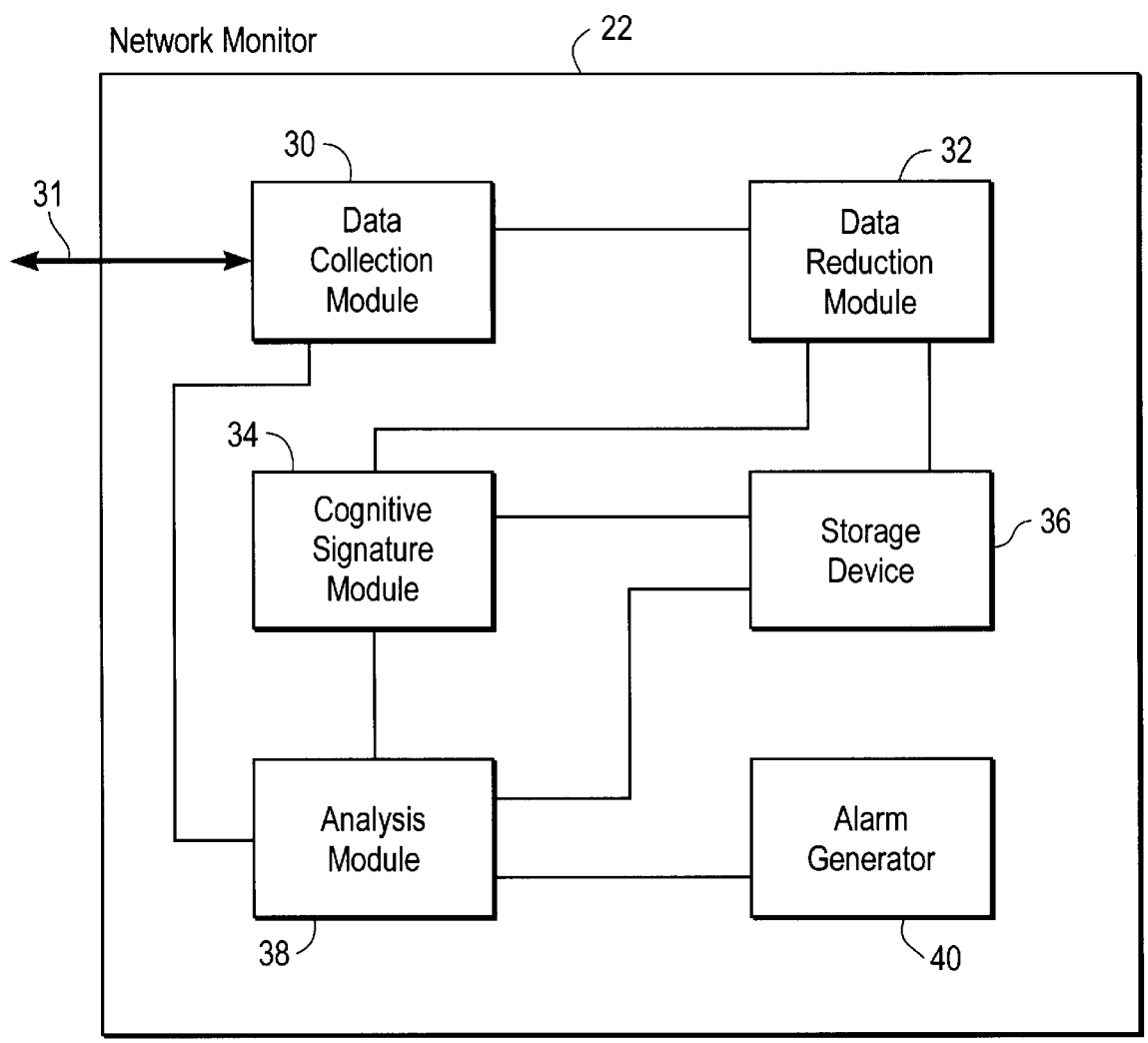
FIG. 2 illustrates an embodiment of a network monitor capable of detecting problems or potential problems in a network environment.

FIG. 2 illustrates an embodiment of a network monitor 22 capable of detecting problems or potential problems in a network environment. Network monitor 22 includes a data collection module 30 that collects information from various devices or applications, such as information regarding network utilization (or device utilization), lost packets, response time, or number of errors. Data collection module 30 collects information regarding the operation or performance of the network environment on one or more communication links 31. Data collection module 30 can collect data from any number of networks and any number of network devices or applications. Data collection module 30 is coupled to a data reduction module 32, which reduces the collected data by reducing the granularity of the data over time and performing statistical reduction of the data, as discussed below.

Data reduction module 32 is coupled to a cognitive signature module 34 and a storage device 36. Cognitive signature module 34 generates and maintains multiple dynamic cognitive signatures based on the data collected from the network. A cognitive signature represents the normal operating mode for a particular network device, network interface, system, application, or communication link with which the cognitive signature is associated. The cognitive signature is based on actual historical data collected regarding the operation and performance of the network environment. The cognitive signature is dynamic, such that it is continually updated to include the most recent data collected by the data collection module.

In a particular embodiment of the invention, a separate cognitive signature is provided for each day of the week. A cognitive signature for a particular day of the week may include data separated into multiple time periods (e.g., each hour of the day). For example, a cognitive signature for Tuesday may include a particular time period that represents the normal operating mode (based on collected historical data) for a particular network device from 9:00 a.m. to 10:00 a.m. on Tuesday. A cognitive signature for Saturday may include a time period that represents the normal operating mode for a particular network interface from 2:00 p.m. to 3:00 p.m. on Saturday. Additional details regarding cognitive signatures are discussed below.

In the embodiment of FIG. 2, cognitive signature module 34 receives data from data reduction module 32. In this embodiment, the granularity of the collected data has already been reduced when received by cognitive signature module 34. In an alternate embodiment of the invention, cognitive signature module 34 may receive data directly from data collection module 30. In this alternate embodiment, cognitive signature module 34 receives the actual data collected, rather than a reduced set of data. Thus, the cognitive signatures can be generated using the actual data without any loss of detail due to averaging or other data reduction procedures.

Storage device 36 may be any type of mechanism capable of storing data, such as a random access memory (RAM), disk drive, or tape drive. Storage device 36 is capable of receiving data from data reduction module 32, cognitive signature module 34, and an analysis module 38. Analysis module 38 receives collected data from data collection module 30, and receives one or more cognitive signatures from cognitive signature module 34. Analysis module 38 analyzes current performance or operation of the network environment by comparing the data collected via the network with the cognitive signatures, which represent past performance or operation of the network environment at similar times for similar devices, systems, or applications. Analysis module 38 may also compare the current data collected with one or more threshold values. Analysis module 38 is coupled to an alarm generator 40. Based on the results of the analysis performed by analysis module 38, an alarm signal may be communicated to alarm generator 40. In response to the alarm signal, alarm generator 40 may generate an e-mail message to a network administrator or other personnel, initiate a page to a network administrator's pager, or communicate the alarm information to another system or application. Additionally, alarm generator 40 may initiate a pre-programmed procedure that is executed in response to a particular type of alarm.

Figure 3:
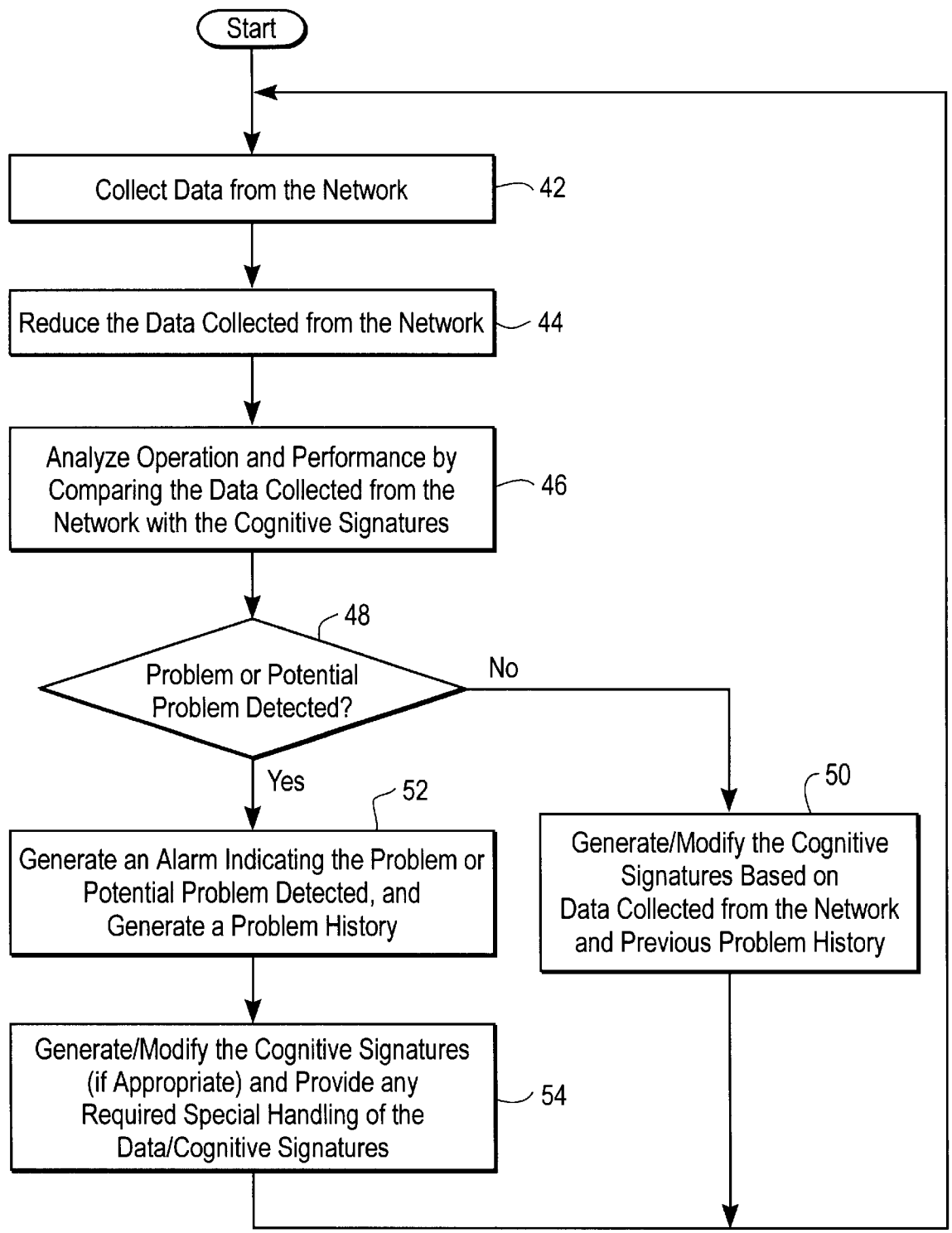
FIG. 3 is a flow diagram illustrating an embodiment of a procedure for detecting problems or potential problems in a network environment.

FIG. 3 is a flow diagram illustrating an embodiment of a procedure for detecting problems or potential problems in a network environment. At step 42, data is collected from the network. As discussed above, the collected data may include various network performance and operation data such as network utilization and application response times. The data is collected, for example, using data collection module 30 shown in FIG. 2. A request for information (such as a status request) is sent to one or more network devices or applications at various time intervals. The request for information requests details regarding particular operation or performance parameters that are available from the network device or application. For example, the request for information may request the current utilization of each interface or network port on a particular network device or may determine the current response time for a particular application. Additionally, the request for information may request details regarding the number of errors or discarded packets associated with each interface or port on a network device. Information can be collected from the various network devices and applications at regular time intervals, such as every five minutes.

The data collection module maintains a table or other collection of information to identify the various network devices and applications from which data is collected. For each network device, the table identifies the parameters or performance data to be requested and the time interval between requests. Thus, the data collected from the network can be selective with respect to the network devices, applications, interfaces or communication ports within a particular device, and with respect to polling time intervals.

At step 44, the procedure reduces the data collected from the network in step 42. Additional details regarding the reduction of the collected data is provided below with respect to FIG. 4. Step 46 analyzes operation and performance by comparing the current data collected from the network (i.e., the data representing the current performance or operation of the network environment) with the cognitive signatures ( i.e., the historical data regarding performance or operation of the network environment). Additional details regarding this analysis are provided below.

At step 48, the procedure determines whether a problem or a potential problem has been detected based on the analysis performed in step 46. If a problem or a potential problem is not detected, then the procedure branches to step 50 to generate and/or modify the cognitive signatures based on data collected from the network and previous problem history. The cognitive signatures are generated (e.g., during an initialization period) or modified to include the recent data collected. This regular update of the cognitive signatures allows the cognitive signatures to be adjusted in response to changes in the operation and performance of the network environment.

If a problem or a potential problem is detected in step 48, the procedure continues to step 52, where an alarm is generated indicating the problem or the potential problem detected. Step 52 also generates a problem history. A problem history is maintained for each problem identified. The problem history identifies information about the source and cause of the problem (if known) as well as the duration of the problem. The problem history may also include the number of occurrences of the problem and may identify other problems that occurred at similar times, thereby allowing the correlation of multiple problems.

Although an alarm is generated in 52, the alarm may not be communicated to the network administrator, depending on the severity of the alarm. Further, if a potential problem is detected, the alarm may not be communicated to the network administrator depending on whether the potential problem is validated as an actual problem. An alarm generator (e.g., alarm generator 40 in FIG. 2) may determine whether to notify the network administrator and determine the manner in which the administrator is notified (e.g., by e-mail, pager, or other mechanism).

Step 54 of FIG. 3 generates or modifies the cognitive signatures based on data collected from the network. As mentioned above, the cognitive signatures are dynamic and continually updated as new data is collected from the network. However, in certain situations, the cognitive signatures may not be updated. For example, if the collected data is significantly different than the associated cognitive signature (e.g., indicating a significant problem), then the cognitive signature may not be updated. Updating the cognitive signature in this atypical situation may skew the cognitive signature. In another example, if the collected data is slightly different than the associated cognitive signature (e.g., indicating a potential minor problem), then the cognitive signature may be update but the weighting provided to the current data is reduced, thereby reducing the current data's affect on the cognitive signature.

Figure 4:
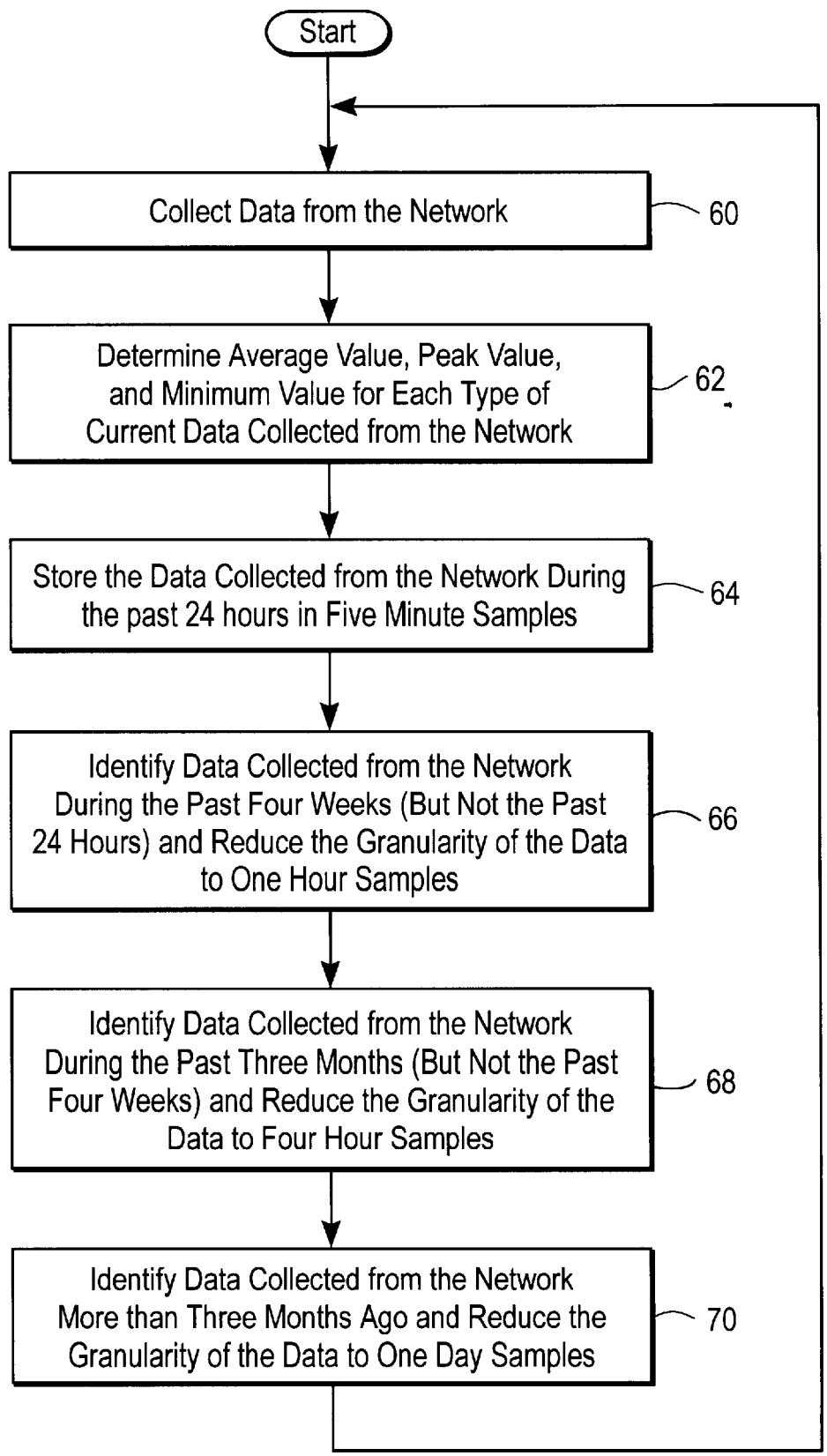
FIG. 4 is a flow diagram illustrating an embodiment of a procedure for reducing data collected from a network.

FIG. 4 is a flow diagram illustrating an embodiment of a procedure for reducing data collected from a network. At step 60, data is collected from one or more network devices or applications in a network. At step 62, the procedure determines an average value, a peak value, and a minimum value for each of type of current data collected from the network.

At step 64, the procedure stores the data collected from the network during the past period in five minute samples. At step 66, the procedure identifies data collected from the network during the past four weeks (but not the past 24 hours) and reduces the granularity of the data to one hour samples. Thus, rather than storing twelve values each hour (five minute samples), the twelve values are consolidated into a single value representing the entire hour. This reduction in data granularity significantly reduces the storage space required for this older data. Thus, the twelve average values for each parameter are consolidated into a single average value. Similarly, the twelve peak values and the twelve minimum values are consolidated into a single peak value and a single minimum value, respectively.

Step 68 identifies data collected from the network during the past three months (but not the past four weeks) and reduces the granularity of the data to four hour samples. This further reduction in data granularity further reduces the storage space required to maintain the historical data. Step 70 identifies data collected from the network more than three months ago and reduces the granularity of the data to one day samples. Thus, the data granularity is reduced as the age of the data increases. The manner in which data is reduced may vary from one device to another or from one interface to another. FIG. 4 illustrates one data reduction procedure that can be used with the present invention. Those of ordinary skill in the art will appreciate that numerous other data reduction procedures may be utilized with the present invention. Furthermore, in alternate embodiments of the invention, data reduction procedures are not used. Although these alternate embodiments require additional storage space for the collected data, they provide increased data granularity (i.e., increased detail).

Figure 5:
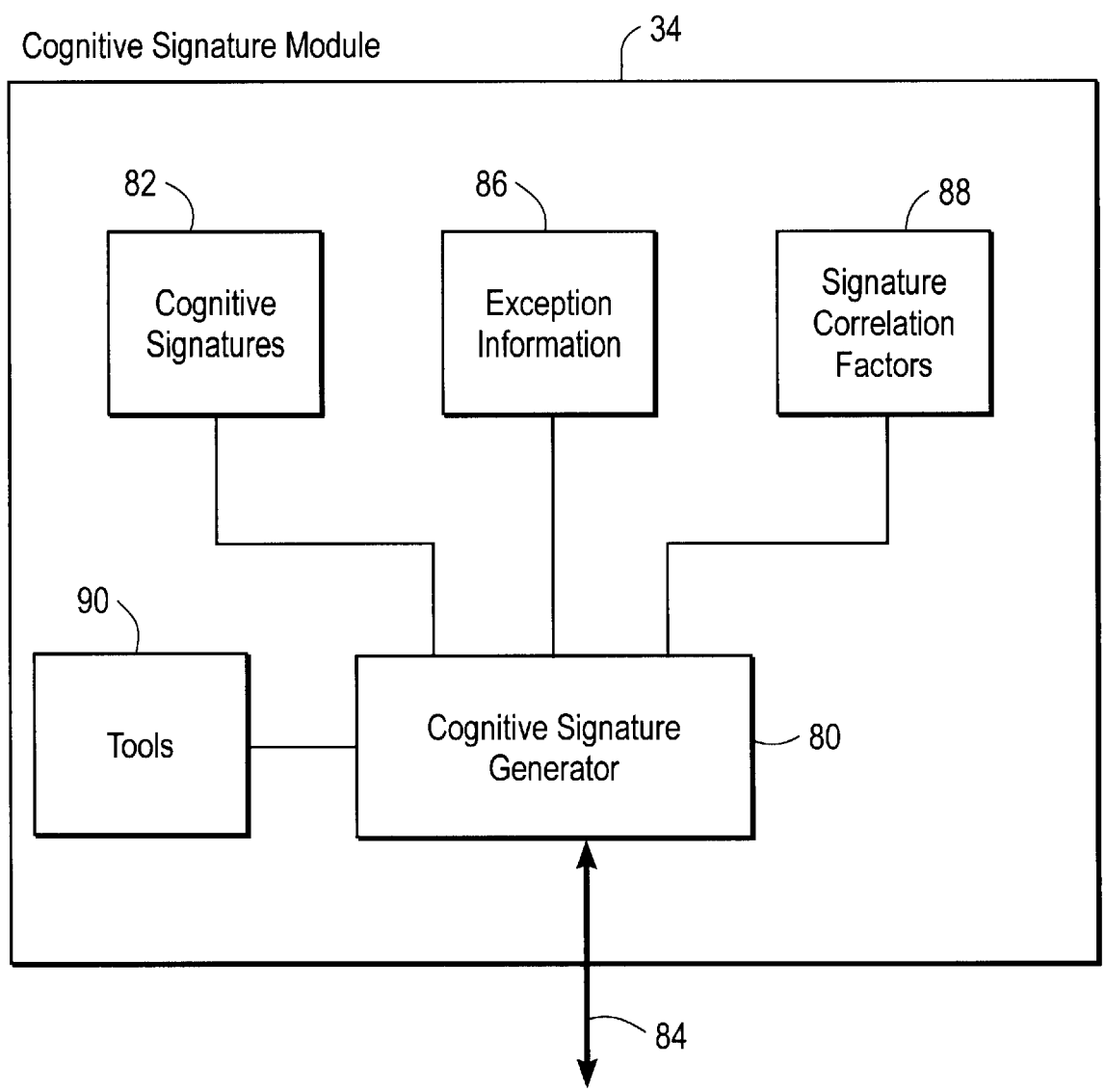
FIG. 5 illustrates an embodiment of a cognitive signature module.

FIG. 5 illustrates an embodiment of a cognitive signature module (e.g., module 34 shown in FIG. 2). Cognitive signature module 34 includes a cognitive signature generator 80 that creates and modifies multiple cognitive signatures. As discussed above, a separate cognitive signature is typically used for each device, application or interface in a network environment. Additionally, separate cognitive signature values can be maintained for different time periods on different days of the week. Cognitive signature generator 80 receives various information regarding network operation, including cognitive signatures 82 and exception information 86. This information is received by cognitive signature generator 80 on data path 84. Cognitive signatures 82 represent the operation and performance of the network environment based on data collected during previous weeks. Cognitive signatures 82 are received from, for example, data collection module 30 or data reduction module 32 (FIG. 2).

Cognitive signatures 82 are adjusted, as necessary, to ignore data during time periods when the network is down or when significant components of the network (e.g., a router or a server) are down or offline.

For example, if several network servers are down for maintenance from 4:00 p.m. to 5:00 p.m. on a particular Friday, the portion of the cognitive signature associated with that time period on Friday is not adjusted. When several network servers are down, data collected from the network is likely to be significantly different from the data that would be collected if the servers were operating. For example, response time may increase significantly when a network device is down or malfunctioning. Updating the cognitive signature in this situation would incorrectly skew the cognitive signatures. Thus, rather than incorporating this atypical information into the cognitive signatures, one or more network parameters are ignored during the time period during which the network servers are down. Therefore, the cognitive signatures associated with these network parameters is not changed.

Exception information 86 contains network operation and performance data regarding infrequent events and events that do not follow a regular pattern. For example, if an increase in network utilization occurs every Monday from 9:00 a.m.–10:00 a.m., the information is included in a cognitive signature because the event occurs on a regular basis. However, other events may occur on an irregular basis. For example, a significant increase in network utilization may occur on the last business day of each month. Similarly, a significant decrease in network utilization may occur on holidays. These irregular but schedulable events are not incorporated into the cognitive signatures 82 and, instead, are stored as separate exception information 86. Cognitive signature generator 80 creates and maintains separate cognitive signatures for each event that occurs on an irregular but schedulable basis. Thus, when selecting an appropriate cognitive signature for use in analyzing current network operation and performance, cognitive signature generator 80 considers both cognitive signatures 82 and exception information 86.

Cognitive signature generator 80 also produces signature correlation factors 88, which indicate the degree of correlation associated with each cognitive signature. The signature correlation factors indicate, based on historical data, the likelihood that a particular network parameter will fall within the range of values defined by the cognitive signature. Certain performance data may be relatively constant from one week to the next during a particular time period. For example, network utilization between 3:00 a.m. and 4:00 a.m. on Saturday may be between five percent and ten percent with very infrequent deviations. In this example, the signature correlation factor may be 0.9, indicating that there is a 90 percent likelihood that the collected data associated with the cognitive signature will be within the range of values specified by the cognitive signature.

In another situation, a particular cognitive signature may not be highly correlated, indicating that the collected data varies significantly. For example, network utilization between 9:00 a.m. and 10:00 a.m. on Monday may vary between 20 percent and 80 percent. In this situation, the correlation factor may be 0.2.

Signature correlation factors are used when analyzing collected data and determining whether to activate an alarm. Additionally, the signature correlation factors are used to determine the severity of an alarm. For example, if the current data collected is outside the cognitive signature by ten percent and the cognitive signature is highly correlated, then the situation is considered an unusual event, and may cause the generation of an alarm. If the current data collected is outside the cognitive signature by 50 percent, then the situation is considered a serious event. However, if the cognitive signature is not highly correlated, then data that is ten percent outside the cognitive signature is not considered to be an important event and does not trigger an alarm. When the cognitive signature is not highly correlated, the current data may need to be outside the cognitive signature by 75 percent or more before an alarm is generated. Additional details regarding the analysis of collected data, including the use of signature correlation factors, are discussed below.

Various cognitive signature tools 90 are available for use by cognitive signature generator 80. Cognitive signature tools 90 can be used to update exception information, such as identifying upcoming holidays or scheduled down times for servers or other devices in the network environment. Cognitive signature tools 90 can also modify cognitive signatures to "undo" the effects of data collected during a particular time period. For example, if a network failure occurred during a particular time period and performance data for that time period was integrated into the cognitive signatures, a tool can be activated to remove the effects of this data from the cognitive signature. This tool thereby eliminates any skewing of the cognitive signature due to the network failure.

Figure 6A:
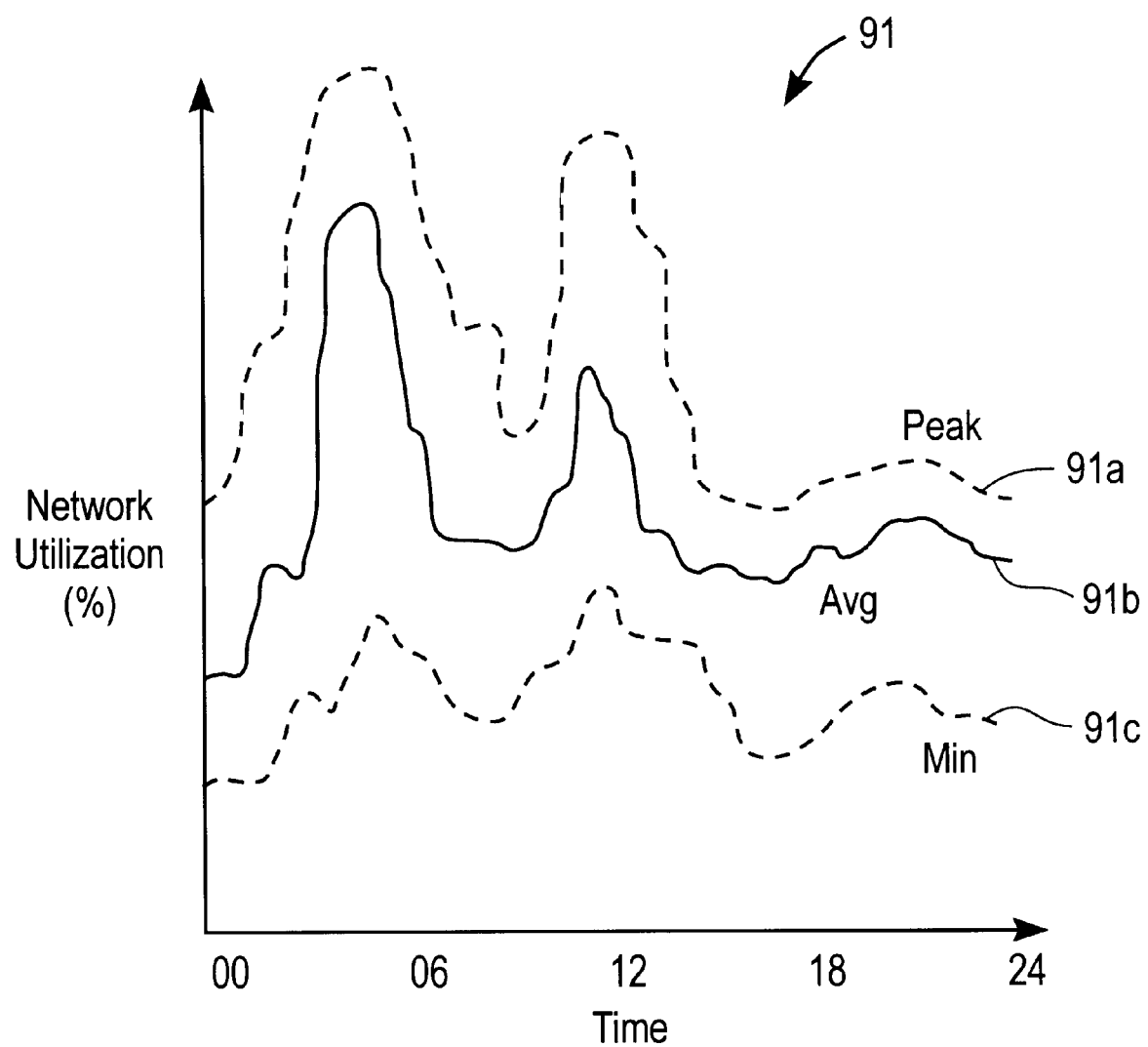
FIG. 6A illustrates an exemplary cognitive signature in a graphical manner.

FIG. 6A illustrates an exemplary cognitive signature 91 in a graphical manner. Embodiments of the invention store the cognitive signature values in a table or other data structure that is easily accessed by a processing device. Cognitive signatures are not necessarily stored in a graphical manner. FIG. 6A illustrates cognitive signature 91 graphically for purposes of explanation. Cognitive signature 91 includes three components: an average line 91a, a peak line 91b, and a minimum line 91c. The peak and minimum lines 91b and 91c define a band or range of values that generally define "typical" values for the parameter associated with cognitive signature 91. Cognitive signature 91 is associated with a particular day of the week (e.g., Tuesday) and a particular network parameter (e.g., network utilization).

Referring to FIG. 6A, the horizontal axis represents time-of-day and the vertical axis represents the utilization of the network (measured from zero percent to 100 percent). Cognitive signature 91 shows that network utilization is generally highest around 4:00 a.m. and 11:00 a.m. Thus, a high network utilization at 11:15 a.m. on a Tuesday might not represent a problem since the utilization parameter is within cognitive signature 91 (i.e., between the peak line 91b and the minimum line 91c). However, a high network utilization at 4:30 p.m. on Tuesday represents a problem (or a potential problem) because cognitive signature 91 indicates that, historically, network utilization has not been high at that time. Similarly, a low network utilization at 4:00 a.m. on Tuesday may indicate a problem because cognitive signature 91 indicates that the network utilization has historically been high at that time. Therefore, cognitive signature 91 is used to identify problems when the associated parameter exceeds peak line 91b or falls below minimum line 91c.

As discussed above, data is collected from the network at various intervals (e.g., every five minutes). Cognitive signature 91 may contain all of the data collected from the network (e.g., five minute samples) or may be reduced to less frequent intervals (e.g., one hour samples). If using one hour samples, cognitive signature 91 will include three values (average, peak, and minimum) for each interval. Thus, all data collected during the one hour period is represented by three values. It will be appreciated that time intervals of any size can be used to generate a cognitive signature. As discussed above, in a particular embodiment of the invention, a separate cognitive signature is maintained for each day of the week in combination with each monitored parameter. Thus, separate cognitive signatures are provided for network utilization on Tuesday, network utilization on Wednesday, application response time on Tuesday, application response time on Wednesday, and so forth. A network monitoring system can maintain hundreds or thousands of cognitive signatures, depending on the number of network environment parameters being monitored.

Figure 6B:
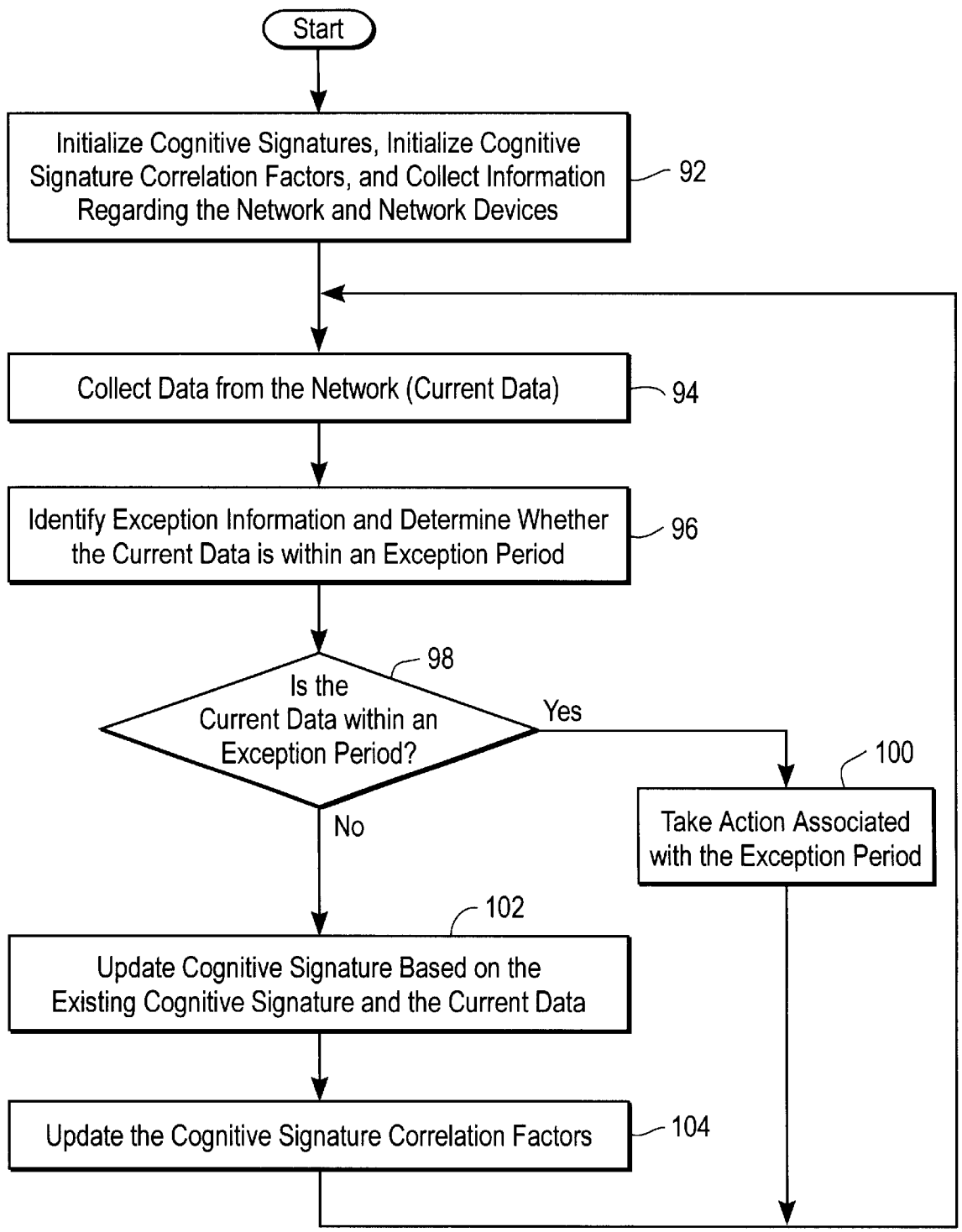
FIG. 6B is a flow diagram illustrating an embodiment of a procedure for generating and modifying cognitive signatures.

FIG. 6B is a flow diagram illustrating an embodiment of a procedure for generating and modifying cognitive signatures. When a network monitor first begins monitoring a network environment, or begins monitoring a new network device, no cognitive signature exists with which the current collected data can be compared. Thus, in step 92 of FIG. 6B, an initialization process is performed to initialize the cognitive signatures and the cognitive signature correlation factors. Step 92 also collects information regarding the network environment, including information regarding various network devices, systems, and applications. During the initialization period, cognitive signatures are generated using the collected data. Since no historical data is available for the same period in previous weeks, the current data may be compared to the cognitive signature data associated with the previous hour or the previous day. After the initialization process has collected data for seven days, cognitive signatures will be available for all time periods on each day of the week. At this point, current data collected from the network is compared to the appropriate cognitive signatures.

At step 94, the procedure collects data (e.g., performance data) from the network. This collected data is referred to as the current data. At step 96, the procedure identifies exception information and determines whether the current data is within an exception period. Exception periods include holidays, maintenance periods, scheduled down times for one or more network devices, and similar irregular events. The exception information can be stored in a table or other data structure and includes the start time and end time of the exception period. The exception information also includes the action to be taken during the exception information. For example, the action may be to ignore all data collected during the exception period (i.e., do not generate alarms or update cognitive signatures) or apply a different weighting to the collected data when updating the cognitive signatures. Different action may be taken depending on the parameter being monitored or the network device or application providing the data. For example, a scheduled down time for a particular device may cause data associated with that device to be ignored, while data associated with other devices is handled in the normal manner.

If the current data is within an exception period, then the procedure branches from step 98 to step 100 to take the appropriate action associated with the exception period. If the current data is not within an exception period, then the procedure continues from step 98 to step 102 to update the cognitive signature based on the existing cognitive signature and the current data. In a particular embodiment of the invention, the cognitive signature value(s) for the period associated with the current data is updated according to the following formula.

New Cog. Sig.=(Old Cog. Sig.*weight1)+(Current Data*weight2)

In this embodiment, two different weighting values are used (weight1 and weight2). These weighting values represent percentages and, when added together, total 100 percent. In a particular embodiment of the invention, emphasis is placed on the historical data (i.e., the Old Cognitive Signature values). In this embodiment, weight1 is 0.80 and weight2 is 0.20, thereby placing a significant emphasis on the historical data. It will be appreciated that various other weighting values may be used depending on the emphasis desired for historical data. The weighting values may vary between different devices, systems, or applications. As discussed above, in certain situations (e.g., when a serious alarm is generated) the existing cognitive signature is not updated (to avoid improperly skewing the cognitive signature values).

After updating the cognitive signature, the procedure of FIG. 6B continues to step 104 to update the cognitive signature correlation factors. The cognitive signature correlation factors are updated by comparing the current data to the associated cognitive signature. For example, if the current data is within the cognitive signature, then the correlation factor is updated to indicate an increased correlation. Similarly, if the current data is not within the cognitive signature, then the correlation factor is updated to indicate a decreased correlation.

Figure 7:
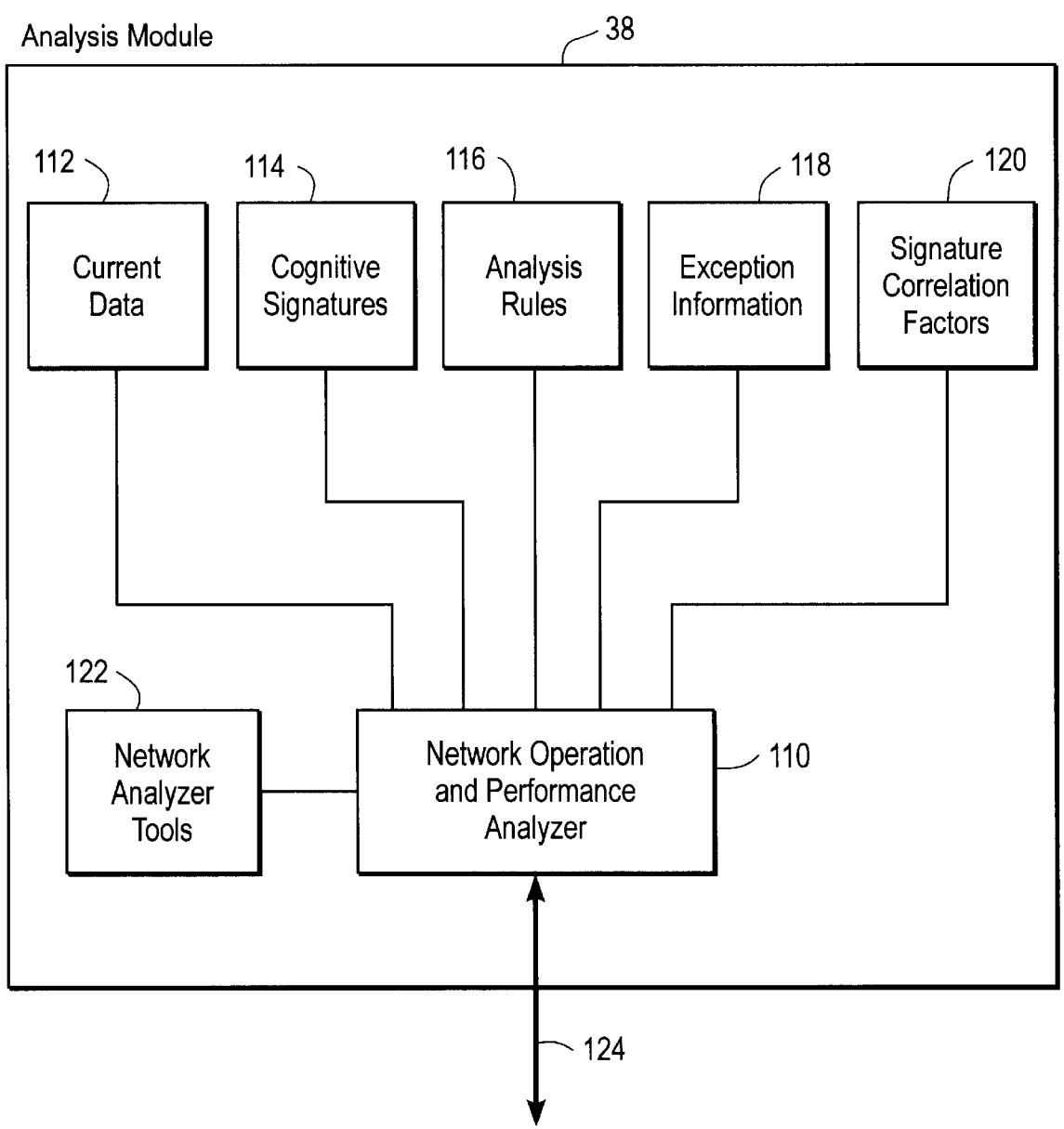
FIG. 7 illustrates an embodiment of an analysis module.

FIG. 7 illustrates an embodiment of an analysis module 38. Analysis module 38 includes a network operation and performance analyzer 110 that monitors a network environment and identifies problems or potential problems in the network environment. Analyzer 110 receives current data 112, one or more cognitive signatures 114, one or more analysis rules 116, exception information 118, and signature correlation factors 120. Current data 112 is received, for example, from data collection module 30 (shown in FIG. 2). Current data may be communicated to analysis module 38 via a data link between data collection module 30 or storage device 36, and current data 112. Cognitive signatures 114, exception information 118, and signature correlation factors 120 are received, for example, from cognitive signature module 34. Analysis rules 116 include one or more rules that compare the current data to one or more cognitive signatures or threshold values. Several exemplary rules are provided below.

If (NetworkUtilization)>(PeakHistoricalUtilization) then Alarm1

If (NetworkUtilization)>(PeakHistoricalUtilization*1.25) then Alarm2

If (ApplicationResponseTime)>(Threshold1) then Alarm8

The first rule generates an alarm (Alarm1) if the current network utilization exceeds the peak historical utilization, as defined by the cognitive signature, for the current time period. Alarm1 indicates the event that caused the alarm (network utilization exceeding peak historical utilization) as well as the network device(s) associated with the parameter (network utilization) associated with the alarm. The second rule generates a different alarm (Alarm2) if the current network utilization exceeds the peak historical utilization by 25 percent. Alarm2 is associated with a more serious event because the current data significantly exceeds the cognitive signature. Thus, if both Alarm1 and Alarm2 are identified by the analysis rules, Alarm1 may be ignored because Alarm2 is a more serious event. The third rule generates an alarm (Alarm8) if a particular application response time exceeds a threshold value (Threshold1). Threshold1 may be a static value that causes an alarm to be generated when the threshold is exceeded, regardless of any cognitive signature associated the application's response time. Thus, analysis rules are used to apply both dynamic cognitive signatures and static threshold values. A particular analysis rule may apply both cognitive signatures and threshold values to one or more network environment parameters.

Other analysis rules consider signature correlation factors as well as cognitive signatures or threshold values. For example:

If ((NetworkUtilization)>(PeakHistoricalUtilization))

and ((SignatureCorrelationFactor)>0.8) then Alarm15

In the above example, the analysis rule generates an alarm (Alarm15) if the current network utilization exceeds the peak historical utilization and the cognitive signature associated with network utilization has a high correlation factor (i.e., above 80 percent). Alarm15 indicates a serious event because network utilization is typically highly correlated, but the current data has exceeded the cognitive signature values for the current time period. An analysis rule may use any combination of current data, cognitive signatures, correlation factors, and exception information.

Network operation and performance analyzer 110 shown in FIG. 7 compares the current data with one or more cognitive signatures or thresholds to determine whether a problem or a potential problem exists in the network environment. This comparison is performed by applying one or more analysis rules, as discussed above. If a problem or a potential problem is identified, analyzer 110 communicates information regarding the alarm to an alarm generator or other device responsible for providing notification of the problem or potential problem. The information regarding the alarm is communicated across a link 124. In one embodiment of the invention, the alarm generator takes an appropriate action based on the alarm information received and information contained in a table or other mechanism that associates particular alarm information with a particular action. In another embodiment of the invention, alarm generator may consider other information in addition to the received alarm information when determining the appropriate action. In this embodiment, the alarm generator may contain additional logic or analysis procedures that determine the appropriate action to perform, if any. Additional details regarding the alarm generator is provided below with respect to FIGS. 9 and 10.

Network operation and performance analyzer 110 is also coupled to network analyzer tools 122. Tools 122 are used to obtain additional information regarding a problem or a potential problem. For example, tools are available to adjust the polling rate of a particular device, system, or application. The polling rate may be adjusted based on network utilization (as network utilization increases, polling may decrease to avoid further congestion of the network communication links). Additionally, the polling rate may be adjusted based on detection of a problem with a particular network device (polling may be increased to closely monitor the operation of the particular network device). Other tools are available to trace a path between two devices or systems in a network environment. For example, if a particular device is not responding, the tool may test all devices, interfaces, and communication links between the network monitor and the particular device. If all other devices, interfaces, and communication links between the network monitor and the non-responsive device are functioning properly, then the problem is with the non-responsive device itself. Network analyzer tools 122 may also include tools for setting threshold values, and creating or modifying analysis rules.

Figure 8:
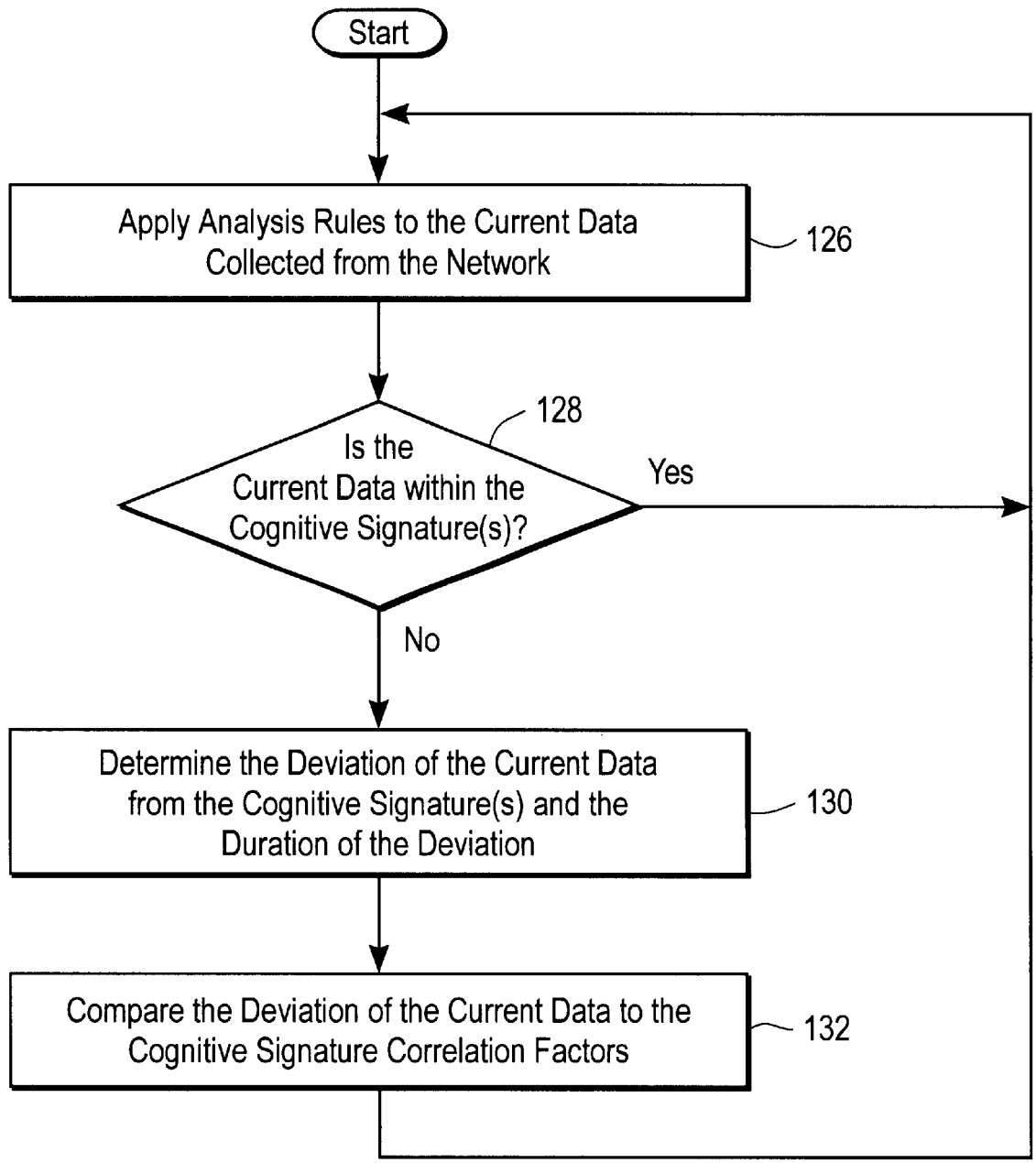
FIG. 8 is a flow diagram illustrating an embodiment of a procedure for analyzing performance or operation of a network environment.

FIG. 8 is a flow diagram illustrating an embodiment of a procedure for analyzing performance or operation of a network environment. At step 126, one or more analysis rules are applied to the current data collected from the network. As discussed above, the analysis rules perform various analysis of the current data in relation to cognitive signatures or thresholds. Step 128 determines whether the current data collected from the network is within the associated cognitive signatures. If the current data is within the associated cognitive signatures, the procedure returns to step 126 to await the collection of the next set of data from the network.

If the current data is not within the associated cognitive signatures, the procedure continues from step 128 to step 130 to determine the deviation of the current data from the associated cognitive signatures and the duration of the deviation. If the current data deviates only slightly from the cognitive signature, it may be ignored or treated as a minor event. However, if the deviation is significant, the deviation may be treated as an important or serious event. If the duration of the deviation is small (e.g., only a few minutes), the deviation may be ignored or treated as a minor event. But, if the duration of the deviation is significant (e.g., several hours), the deviation may be treated as an important or serious event. Step 132 compares the deviation of the current data to the cognitive signature correlation factors. As discussed above, the signature correlation factors can be used to determine the severity of the deviation based on the historical correlation of the cognitive signature. Although steps 126, 130 and 132 are shown as three separate steps, they may be combined into a single step (e.g., by applying analysis rules that compare the current data to the cognitive signatures as well as determining deviation from the cognitive signature and considering the signature correlation factors). The analysis results generated by the procedure shown in FIG. 8 are then used by other systems and procedures, discussed herein, to determine whether a problem or a potential problem exists, and whether an alarm should be generated.

In one embodiment of the invention, step 128 in FIG. 8 also determines whether the current data is within the cognitive signature for the previous time period or within the cognitive signature for the next time period. Thus, step 128 compares the current data to three different cognitive signatures (i.e., the cognitive signatures for the previous, current, and next time periods). By comparing the current data to the previous time period and the next time period, the procedure is able to identify a pattern or event that is shifted in time. For example, a high network utilization may typically occur between 2:00 p.m. and 3:00 p.m. If a high network utilization occurs between 1:00 p.m. and 2:00 p.m., the procedure may not consider it to be unusual because high network utilization typically occurs during the next time period. By analyzing adjacent cognitive signatures, the procedure is able to avoid generating false alarms when a typical pattern or event has been shifted in time to an adjacent time period.

Figure 9:
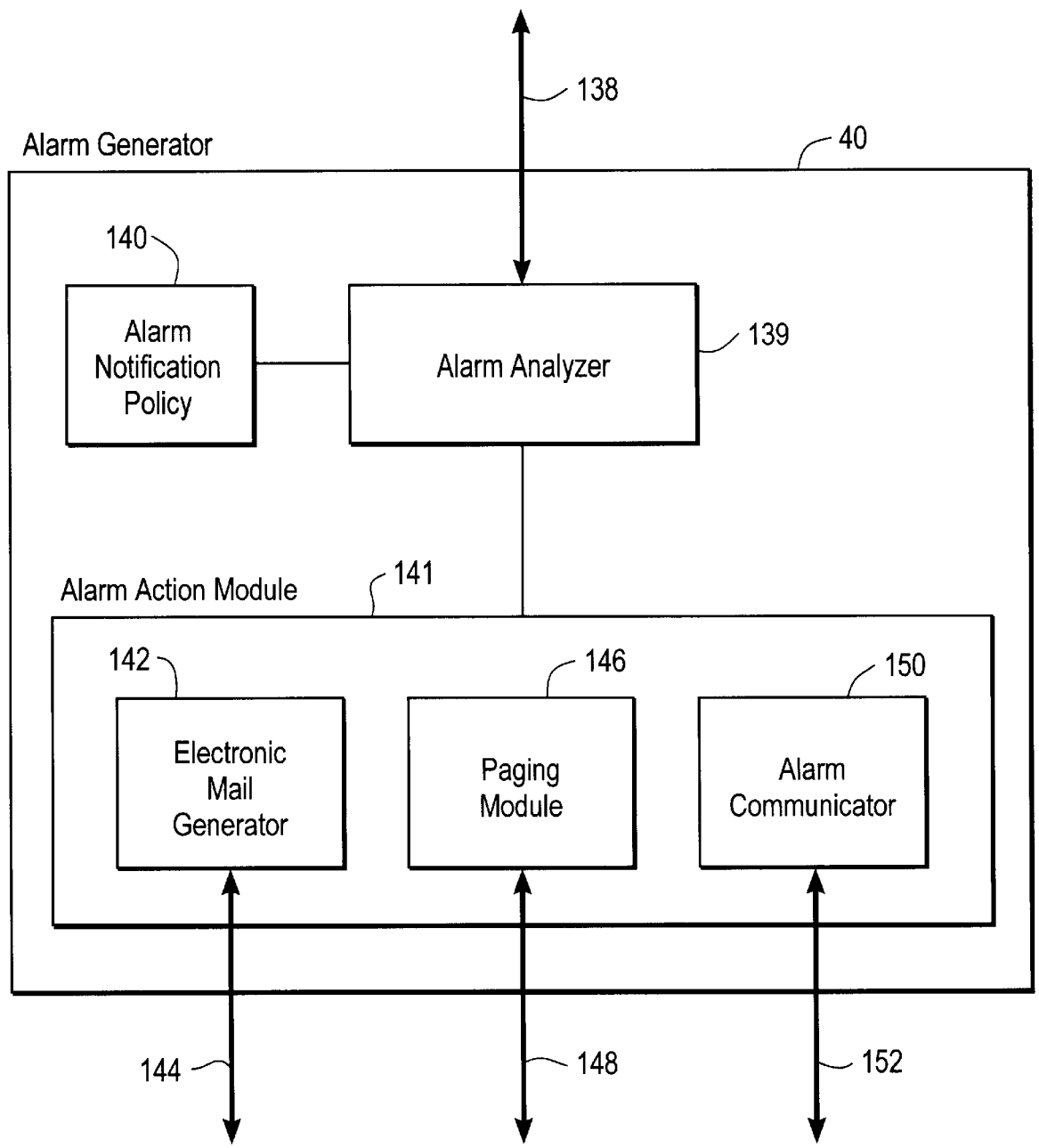
FIG. 9 illustrates an embodiment of an alarm generator.

FIG. 9 illustrates an embodiment of an alarm generator. Alarm generator 40 includes an alarm analyzer 139 that receives alarm information from an analysis module (e.g., analysis module 38 in FIG. 2) indicating the type of alarm and the severity of the alarm. The alarm information is received on a link 138. The alarm type may indicate whether the problem is a hardware problem or a software problem, or may indicate the type of device or application in which the problem was identified. The alarm type may also indicate the parameter (e.g., network utilization) that triggered the alarm. The severity of the alarm indicates whether the problem is a significant problem that requires immediate attention, a minor problem that should be monitored, or a moderate problem that should receive attention when a network administrator is available.

Alarm analyzer 139 is coupled to alarm notification policy 140 and alarm action module 141. Alarm notification policy 140 identifies the manner in which a network administrator or other individual is notified of an alarm. Additionally, alarm notification policy 140 may identify a particular action to take in response to an alarm. The manner in which notice is provided may depend on the type of alarm or the severity of the alarm. A severe alarm may cause a network administrator to be paged or otherwise immediately contacted, whereas a minor alarm may provide notice to the network administrator via e-mail or other lower priority mechanism. Alarm action module 141 implements the types of actions to take in response to various alarms. Actions include resetting a network device or application, or deactivating particular interfaces or communication links that are experiencing problems. Based on the received alarm information and the alarm notification policy, alarm analyzer 139 determines how to handle the alarm, and communicates the action to alarm action module 141.

Alarm analyzer 139 is also able to correlate multiple events into a single alarm or a single problem. Certain events are predictable in response to other events. For example, an increase in network utilization generally causes an increase in response time and an increase in network errors. Thus, if network utilization increases significantly and, at approximately the same time, response time increases, then the two events (utilization and response time increase) may be treated as a single event. Similarly, if several devices along a common path experience common problems (e.g., a communication problem on the path), the events may be treated as a singe event rather than multiple individual events. Also, errors on multiple interfaces of a device may be treated as a single event because a problem with the device may be the cause of all interface errors.

Alarm action module 141 includes multiple modules capable of communicating an alarm or other problem indicator to a network administrator or other individual or system. An electronic mail generator 142 is capable of generating and sending an e-mail message identifying various information about the problem or alarm. For example, the e-mail message may include information regarding the type of problem, the severity of the problem, and the likely source of the problem, if known. The e-mail message is sent to one or more network administrators, managers, or other personnel across a communication link 144. A paging module 146 may generate and send a pager message to one or more pagers (e.g., pagers carried by a network administrator or other individual responsible for handling problems in the network environment). Paging module 146 communicates the pager message across communication link 148. In one embodiment, paging module 146 automatically dials the appropriate pager number and communicates the message to the pager. In another embodiment, paging module 146 communicates the pager number and message to another device (across communication link 148), which then generates the page.

An alarm communicator 150 is capable of communicating alarm information to another device or system across communication link 152. Additionally, alarm communicator 150 is capable of activating an application or process, such as an executable code sequence. The application may be located on the network monitor, or on any another device or system in the network environment. The particular application activated is determined by the information contained in alarm notification policy 140 and/or alarm action module 141. Several different applications may be executed depending on the type of alarm, source of the problem, or type of parameter that triggered the alarm. For example, alarm communicator 150 can reset a device, subsystem or component that may be the source of a problem. After taking this action, analysis module 38 will analyze network operation and performance to determine whether the problem has been corrected.

Figure 10:
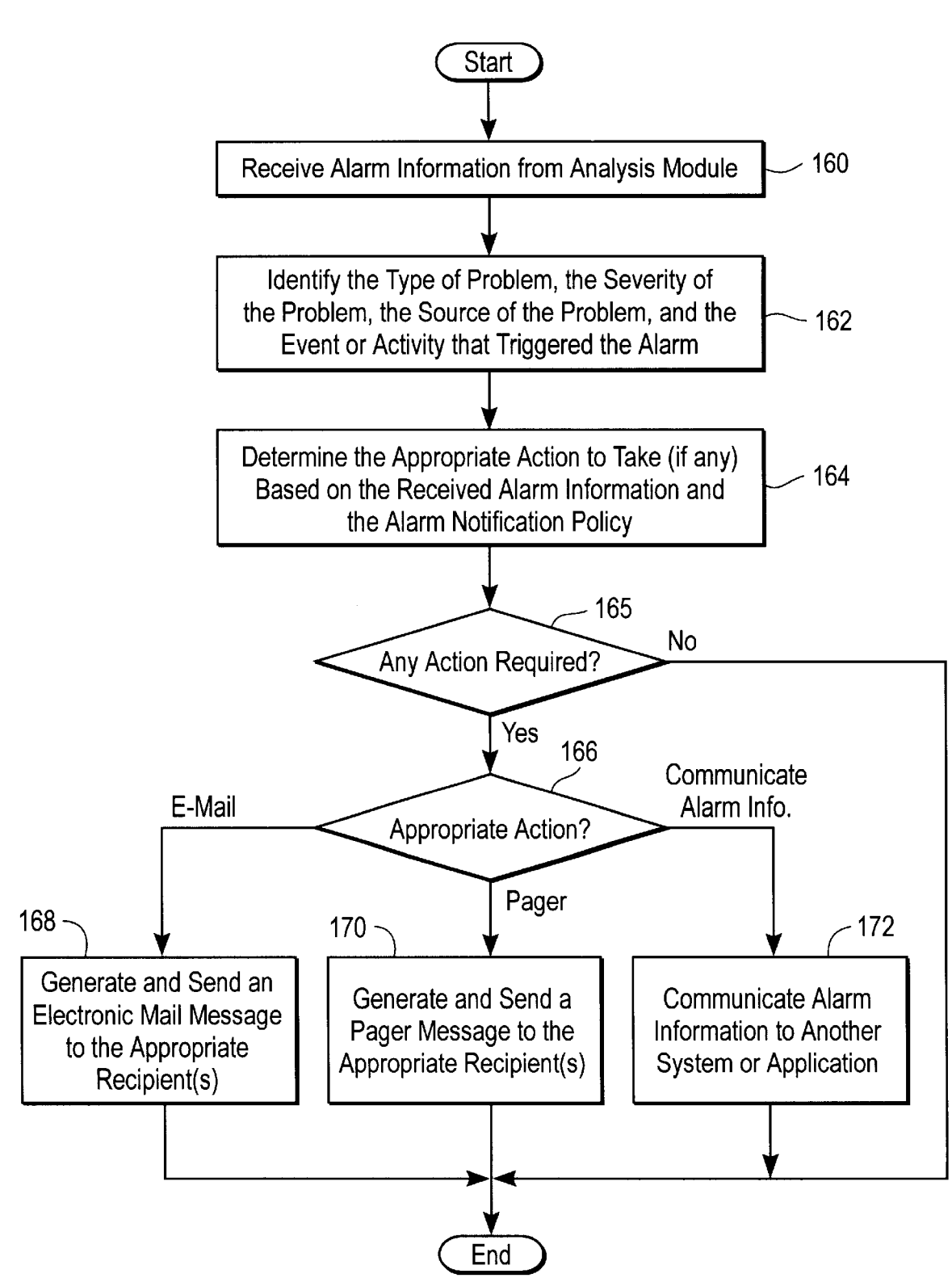
FIG. 10 is a flow diagram illustrating an embodiment of a procedure for generating an alarm based on analysis of network performance.

FIG. 10 is a flow diagram illustrating an embodiment of a procedure for generating an alarm based on analysis of the network environment. At step 160, alarm information is received from an analysis module (e.g., analysis module 38 in FIG. 2). Step 162 identifies the type of problem, the severity of the problem, the source of the problem (if known), and the event or activity that triggered the alarm. Step 164 then determines the appropriate action to take, if any, based on the received alarm information and the alarm notification policy. The appropriate action may include generating a pager message, an e-mail message, or activating another application or procedure. For example, an e-mail message can be used to communicate information regarding minor problems or other events that do not require immediate attention. A pager message is generated for all important alarms and all serious alarms, such that a network administrator or other individual is immediately notified of the problem. An application can be activated by the alarm generator to take an action appropriate for the alarm.

Step 165 determines whether any action is required. If the alarm is a minor alarm, the alarm generator may ignore the alarm and not take action, unless the alarm continues for a significant period of time or increases in severity. If action is required, the procedure continues to step 166, which branches to one of three different steps depending on the appropriate action determined in step 164. If the appropriate action is an e-mail, the procedure branches to step 168, which generates and sends an e-mail message to the appropriate recipients. If the appropriate action is a pager message, the procedure branches to step 170, which generates and sends a pager message to the appropriate recipients. If the appropriate action is the communication of alarm information to another device or application, the procedure branches to step 172, which communicates alarm information to another system or application. Step 172 may also activate an application or procedure on the network monitor or other device in the network environment. Although steps 168, 170, and 172 are shown as alternative steps, a particular alarm may trigger any or all of the steps. For example, a serious alarm (or serious problem) may cause the generation and sending of both an e-mail message and a pager message, as well as the activation of an application or procedure.

Figure 11:
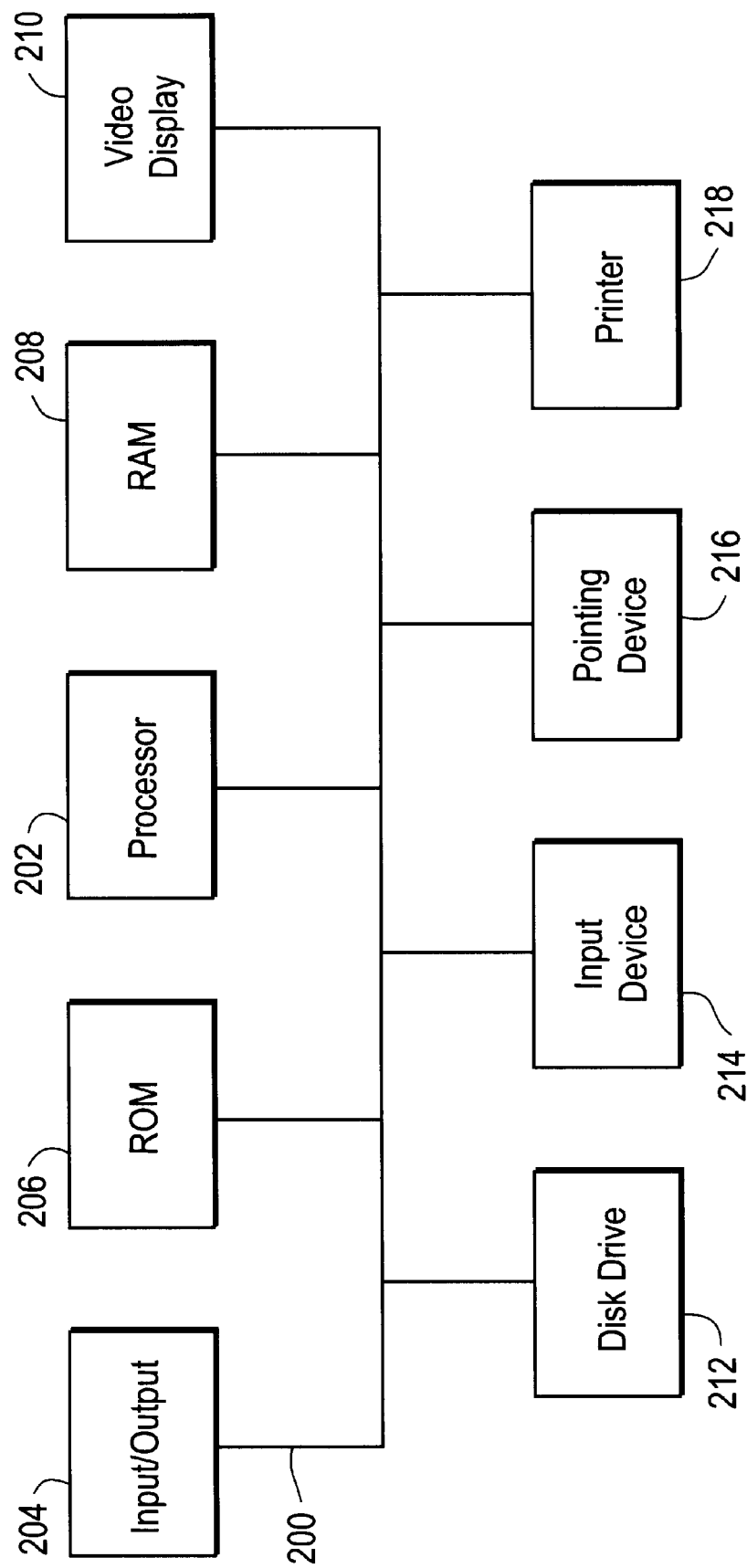
FIG. 11 illustrates an embodiment of a computer system that can be used with the present invention.

FIG. 11 illustrates an embodiment of a computer system that can be used with the present invention. For example, embodiments of the invention may use a computer of the type shown in FIG. 11 for a network monitor, a network device, a server, or any other device contained in or used with the monitoring system discussed above. The various components in FIG. 11 are provided by way of example. Certain components of the computer in FIG. 11 can be deleted for particular implementations of the invention. The computer system shown in FIG. 11 may be any type of computer, including a general purpose computer.

FIG. 11 illustrates a system bus 200 to which various components and devices are coupled. A processor 202 performs the processing tasks required by the computer. Processor 202 may be any type of processing device capable of implementing the steps necessary to perform the various procedures and operations discussed above. An Input/Output (I/O) device 204 provides a mechanism for communicating with other devices coupled to the computer. A Read-Only Memory (ROM) 206 and a Random Access Memory (RAM) 208 provide a storage mechanism for various data and information used by the computer. Although ROM 206 and RAM 208 are shown coupled to bus 200, in alternate embodiments, ROM 206 and RAM 208 are coupled directly to processor 202 or coupled to a dedicated memory bus (not shown).

A video display 210 displays various information and data to the user of the computer. A disk drive 212 provides a mechanism for the long-term mass storage of information. An input device 214 and a pointing device 216 allow the user of the computer to enter information and commands to the computer system. Input device 214 may be, for example, a keyboard, keypad, handwriting recognition device, or voice recognition device. Pointing device 216 includes, for example, a mouse, track ball, or touch pad. A printer 218 is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computer-readable medium is used to perform various monitoring, analysis, communication, and processing operations, such as those described above. The computer-readable medium may be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method comprising:
   collecting recent data associated with operation of a network environment;
   analyzing the network environment by comparing the collected recent data with dynamically configured cognitive signatures, the dynamically configured cognitive signatures being adjustable to account for selected network activity in order to represent normal operation modes of the network environment; and
   determining whether a problem exists based on the analyzed network environment.

2. The method of claim 1, wherein the determining of whether a problem exists includes determining whether a potential problem exists based on the analyzed network environment.

3. The method of claim 1, wherein the dynamically configured cognitive signatures represent normal operation modes for temporal network activity of the network environment.

4. The method of claim 1, wherein the analyzing of the network environment includes determining a signature correlation factor associated with one of the dynamically configured cognitive signatures.

5. The method of claim 1, wherein the dynamically configured cognitive signatures include information related to a summary of previous performances of the network environment.

6. The method of claim 1, wherein the dynamically configured cognitive signatures include information related to performances of the network environment prior to the collection of the recent data associated with the operation of the network environment.

7. The method of claim 1, further comprising:
   updating the dynamically configured cognitive signatures to include the collected recent data.

8. The method of claim 1, wherein the collected recent data includes network performance data.

9. The method of claim 1, wherein the collected recent data includes network configuration data.

10. The method of claim 1, wherein the collected recent data includes recent traffic flow through the network environment.

11. The method of claim 1, wherein the collected recent data includes recent utilization information of network resources operating within the network environment.

12. The method of claim 1, wherein the collected recent data includes network error information.

13. The method of claim 1, further comprising:
    generating an alarm if a problem exists based on the analyzed network environment.

14. The method of claim 13, wherein the generating of the alarm includes generating an electronic mail message and sending the electronic mail message to a network administrator.

15. The method of claim 13, wherein the generating of the alarm includes generating a pager message and communicating the pager message to a pager.

16. The method of claim 13, wherein the generating of the alarm includes activating an application on a device within the network environment.

17. The method of claim 1, wherein the analyzing of the network environment includes correlating multiple related events into a single event.

18. A method comprising:
    collecting recent data associated with operation of a network device;
    analyzing the network device by comparing the collected recent data with dynamically configured cognitive signatures, the dynamically configured cognitive signatures being adjustable to account for selected network activity in order to represent normal operation modes of the network device; and
    determining whether a problem exists based on the analyzed network device.

19. The method of claim 18, wherein the determining of whether a problem exists includes determining whether a potential problem exists based on the analyzed network device.

20. The method of claim 18, wherein the dynamically configured cognitive signatures represent normal operation modes for temporal network activity of the network device.

21. The method of claim 18, wherein the analyzing of the network device includes determining a signature correlation factor associated with one of the dynamically configured cognitive signatures.

22. The method of claim 18, wherein the dynamically configured cognitive signatures include information related to performances of the network device performances prior to the collection of the recent data associated with the operation of the network device.

23. The method of claim 18, further comprising:
    updating the dynamically configured cognitive signatures to include the collected recent data.

24. The method of claim 18, wherein the collected recent data includes recent utilization of the network device.

25. The method of claim 18, wherein the collected recent data includes the performance of a component within the network device.

26. The method of claim 18, wherein the collected recent data includes performance data of a sub-system within the network device.

27. The method of claim 18, further comprising:
    generating an alarm if a problem exists based on the analyzed network device.

28. The method of claim 27, wherein the generating of the alarm includes generating an electronic mail message and sending the electronic mail message to a network administrator.

29. The method of claim 27, wherein the generating of the alarm includes generating a pager message and communicating the pager message to a pager.

30. The method of claim 27, wherein the generating of the alarm includes activating an application on the network device.

31. The method of claim 18, wherein the analyzing of the network device includes correlating multiple related events into a single event.

32. A network device comprising:

a data collection module to collect recent data associated with operation of a network environment;

a cognitive signature module coupled to the data collection module and to configure dynamically cognitive signatures associated with the network environment, the cognitive signatures being adjustable to account for selected network activity in order to represent normal operation modes of the network environment; and an analysis module coupled to the data collection module and the cognitive signature module and to compare the data collected by the data collection module with the cognitive signatures associated with operation of the network environment; and wherein the analysis module is to determine whether a problem exists based on the comparison of the data collected by the data collection module with the cognitive signatures.

33. The network device of claim 32, wherein the cognitive signature module is to associate temporally the cognitive signatures with the network environment.

34. The network device of claim 33, wherein the cognitive signature module is to update the cognitive signatures to include the data collected by the data collection module.

35. The network device of claim 32, wherein the cognitive signatures include information related to performances of the network environment prior to the collection of recent data associated with the operation of the network environment.

36. The network device of claim 32, further comprising:

an alarm generator to generate an alarm if the analysis module determines that a problem exists.

37. A network device comprising:

means for collecting recent data associated with operation of a network environment;

means for analyzing the network environment by comparing the data collected by the means for collecting recent data with dynamically configured cognitive signatures, the dynamically configured cognitive signatures being adjustable to account for selected network activity in order to represent normal operation modes of the network environment; and means for determining whether a problem exists based on the analysis performed by the means for analyzing the network environment.

38. The network device of claim 37, further comprising:

means for temporally associating the dynamically configured cognitive signatures with the network environment.

39. The network device of claim 37, further comprising:

means for updating the dynamically configured cognitive signatures to include the data collected by the means for collecting recent data.

40. The network device of claim 37, wherein the dynamically configured cognitive signatures include information related to performances of the network environment prior to the collection of recent data associated with the operation of the network environment.

41. The network device of claim 37, further comprising:

means for generating an alarm if a problem exists.

42. A computer software product including a medium readable by a processor, the medium having stored thereon a sequence of instructions which, if executed by the processor, cause the processor to perform an operation comprising:

collecting recent data associated with operation of a network environment;

analyzing the network environment by comparing the collected recent data with dynamically configured cognitive signatures, the dynamically configured cognitive signatures being adjustable to account for selected network activity in order to represent normal operation modes of the network environment; and determining whether a problem exists based on the analysis of the network environment.

43. The computer software product of claim 42, wherein the dynamically configured cognitive signatures are temporally associated with the network environment.

44. The computer software product of claim 42, wherein the dynamically configured cognitive signatures include information related to a summary of previous performances of the network environment.

45. The computer software product of claim 42, further including a sequence of instructions which, if executed by the processor, cause the processor to perform an operation comprising:

updating the dynamically configured cognitive signatures to include the recent data collected.

46. The computer software product of claim 42, further including a sequence of instructions which, if executed by the processor, cause the processor to perform an operation comprising:

generating an alarm if a problem exists.

* * * * *